United States Patent [19]

Burklin

[11] Patent Number: 5,356,258
[45] Date of Patent: Oct. 18, 1994

[54] REFUSE COMPOSTING METHOD AND APPARATUS

[76] Inventor: Werner Burklin, Sonnhaldenstr. 8, CH-8280 Kreuzlingen, Switzerland

[21] Appl. No.: 826,021

[22] Filed: Jan. 27, 1992

Related U.S. Application Data

[62] Division of Ser. No. 259,175, Oct. 18, 1988, Pat. No. 5,104,805.

[30] Foreign Application Priority Data

Oct. 19, 1987 [DE] Fed. Rep. of Germany ....... 3735362

[51] Int. Cl.⁵ .................................................. B60P 1/00
[52] U.S. Cl. .................. 414/1501; 414/555; 241/82
[58] Field of Search ............... 414/501, 555; 241/82

[56] References Cited

U.S. PATENT DOCUMENTS 3,954,194  5/1976  Stedman ..................... 414/555 X

FOREIGN PATENT DOCUMENTS 0074533  3/1983  European Pat. Off. ............ 414/501
3444609  6/1986  Fed. Rep. of Germany ...... 414/501
1470213  4/1989  U.S.S.R. ........................... 414/501

*Primary Examiner*—Ferris Lander
*Attorney, Agent, or Firm*—Bachman & LaPointe

[57] ABSTRACT

A method of composting garbage or refuse, in particular coarse refuse such as shrubs or bushes or the like, wherein the garbage is crushed and passed to a storage location, is to be improved in that the operation of crushing the garbage is effected while it is being picked up into a transportation vehicle and the crushed refuse is fed by the vehicle directly to a rotting dump. In addition the crushed refuse is to be conveyed, preferably by centrifugal force, to a downwardly open impact chamber which is closed all around and which stands up from the storage location, in which the refuse is distributed to form a rotting layer, whereupon the chamber is raised by the height of the layer and further material is built up on the surface thereof to produce a further layer.

12 Claims, 4 Drawing Sheets

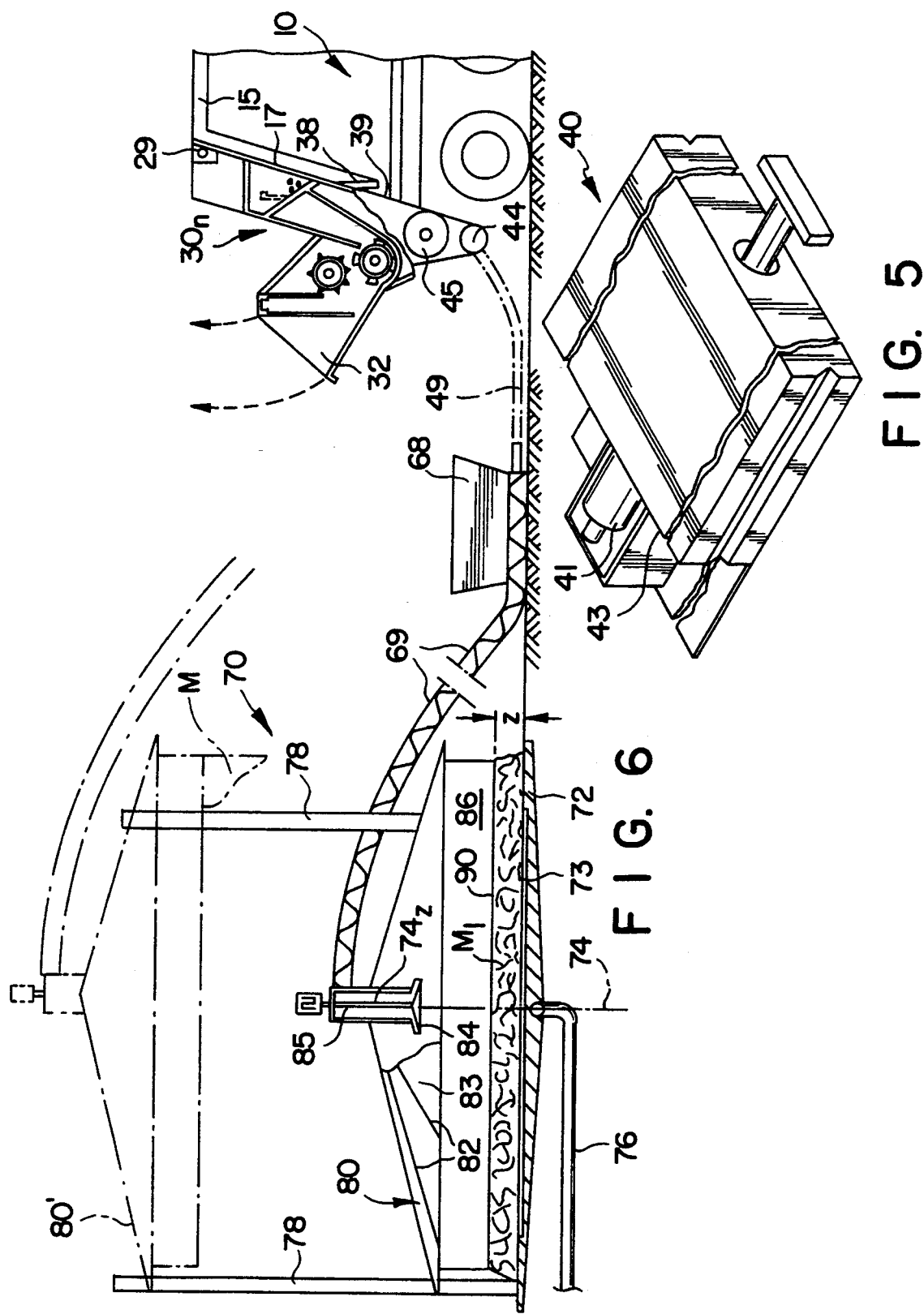

REFUSE COMPOSTING METHOD AND APPARATUS

This is a division of application Ser. No. 259,175 filed Oct. 18, 1988 now U.S. Pat. No. 5,104,805, Apr. 14, 1992.

BACKGROUND OF THE INVENTION

The invention relates to a method of and an apparatus for composting garbage or refuse, in particular coarse refuse such as shrubs or bushes or the like, wherein the garbage is crushed and passed to a storage location. The invention also concerns a vehicle with a container for accommodating the garbage, and a tail structure, which is suitable in particular for carrying out that method.

A method of that nature, and an apparatus, with a roof covering over the storage location, for carrying out the method, are to be found in the present inventor's AT patent specification No 375,909; in that arrangement, the refuse is crushed in a large-volume installation and fed to a large hall-like structure which extends over the decomposition location and which is provided with air passages beneath its floor. The air is sucked out of the space above the material in the resulting silo structure and is then passed through the silo for cleaning purposes.

It is also known for domestic refuse to be picked up with a vehicle which has a container with a tail-mounted device for introducing the refuse thereinto, for it to be transported to a refuse hall or the like.

Being aware of that state of the art, the inventor set himself the aim of providing a method for permitting simplified processing and treatment of refuse, in particular coarse refuse such as garden refuse or the like, which is produced in comparatively small amounts at different locations.

In addition the invention seeks to provide an apparatus which, unlike a large composting works, can be set up in simplified form.

SUMMARY OF THE INVENTION

That object is attained in that the operation of crushing the garbage is effected while it is being picked up into a transportation vehicle and the crushed refuse is fed by the vehicle directly to a rotting layer. It has been found advantageous for the crushed refuse to be conveyed to an impact chamber or the like which is closed all around and which is open downwardly and which stands up from the storage location, and for the crushed refuse to be distributed in the chamber to form a rotting layer, preferably by means of centrifugal forces, whereupon the chamber is raised by the height of the rotting layer and further material is built up on the surface thereof to produce a further layer.

Those features make it possible to produce in a simple fashion comparatively small layer-like decomposition arrangements which can even be temporarily set up close to the location at which the refuse is produced. In addition thereto, the vehicle according to the invention, as described hereinafter, picks up the coarse refuse at the location at which it occurs, and transports it in already crushed form to the rotting apparatus into which it passes directly from the vehicle.

In accordance with the invention there is also provided a configuration of the transportation vehicle such that a slow-speed screw or cutting mill is disposed downstream of an intake hopper and is arranged above a conveyor element and below an impact space, wherein the conveyor element terminates at an opening through the rear wall of the container, or the like, in order to transport the crushed refuse into the container.

In a particularly preferred embodiment, arranged downstream of the intake hopper is a high-speed impact rotor with a correspondingly curved grid which adjoins the impact circle thereof and which extends above the conveyor element between the intake hopper and a wall means of an impact space, wherein the conveyor element also terminates at the opening through the rear wall of the vehicle. In particular that construction permits very effective crushing of undergrowth or brushwood, branches and corresponding pieces of coarse refuse between the impact rotor and the grid - the very finely crushed particles drop on the conveyor element through the grid while hard items are slung upwardly in the impact space and are caught above the impact space. In that way it is possible for the crushed refuse to be dumped immediately.

For reasons of better handling, it has been found advantageous for the filling hopper to be arranged above the vehicle bed or platform, which is possible without problems arising as the impact rotor readily 'gobbles up' coarse and garden refuse, that is to say the danger of branches or the like being slung back in the opposite direction to the direction of conveying movement is eliminated.

A collecting box which, in accordance with the invention, is arranged above the impact space, for catching hard items which are slung up, is connected to the impact space through an opening which is closed by means of a flap; the hard items knock the flap open and pass into the collecting box, and then the flap automatically drops back on to the opening.

A thrust plate is associated on the one hand with the impact rotor and on the other hand with the through opening in the rear wall of the container, to provide the conveyor element. The purpose of the thrust plate is to move small material which trickles out of the grid upwardly to the container, with a thrust edge. A plurality of conveyor screws may also be provided instead of the thrust plate.

The tail structure can be pivoted away from the tail or rear of the vehicle about an axis which lies approximately at the roof of the container, and then frees a discharge conveyor device, disposed beneath the tail structure, for the refuse which is to be discharged. That pivotal movement of the tail structure away from the tail of the vehicle is effected prior to the operation of unloading the container-in that operation, a thrust plate or wall member pushes the refuse to the discharge conveyor device which is preferably in the form of a collecting screw and is connected to a conveyor conduit. Prior to the operation of discharging the crushed refuse, the conveyor conduit is connected to an outside conduit in which, by means of a screw or by compressed air, the very small particles of refuse are passed to a distributor device which has still to be described.

In accordance with a further feature of the invention, towards its roof the vehicle carries a slewing ring or a corresponding element with a grab arm having a grab device which is pivotable about the vehicle. That provides that the coarse refuse can be picked up around the vehicle and passed to the intake hopper. Grab devices of that kind are known per se for example from German utility model No 84 33 929, but in the case of the vehicle according to the invention, in their particular configuration, they are of great benefit, particularly when the grab arm is provided with a pivot or hinge and the two parts of the arm are connected by means of a hydraulic cylinder.

An apparatus for producing a layer rotting arrangement or silo on a storage location is of independent inventive significance; in accordance with the invention the roof is formed in a cover lid-like configuration with a wall means which is suspended therefrom and which extends therearound in an apron-like configuration, to form a distributor or impact chamber for refuse supplied thereto, and is mounted to be movable to different vertical spacings relative to the storage location. That roof is preferably in the form of a boiler end plate-like structure and the apron-like wall means hangs downwardly therefrom for example over a height of 800 mm. The roof is set with the lower edge of the wall means or apron structure on to the ground, thus providing a distributor chamber for the crushed refuse which is supplied at the apex of the roof. From there, the refuse can be driven by means of a cell-type wheel member or a corresponding centrifuging device against the inward side of the wall means which is stable in respect of shape and which forms an impact wall for the outwardly slung particles, so that a rotting layer of a thickness which approximately corresponds to the height of the wall means is built up in a simple fashion.

It has been found advantageous for the height of the wall means to be variable, for example by virtue of concentric rings, so that even decomposition layers of small height can be laid out. It is known that layer thicknesses of about 20 mm have been found to be particularly expedient in regard to the rotting or composting process.

The layer rotting arrangement is preferably built up on a floor plate which is provided with air passages and which includes support pillars for the roof; the latter is mounted on the support pillars and is adjustable in respect of height by means of a cable arrangement or the like. Such adjustment in respect of height permits a plurality of layers to be arranged in superposed relationship, as described above, while in addition it determines the definitive height of the rotting layer arrangement which is preferably 5 to 6 meters.

In accordance with the invention the support pillars are arranged to carry air and are each connected to a respective air passage and air pipe of the floor plate. That provides an air system which readily permits venting and ventilation of the silo configuration produced. Preferably the air which accumulates in the head space or the space above the material in question, as described in AT patent specification No 375 909, is fed to the composting material from below and is passed through same, with a cleaning action. It will be appreciated however that it is also possible for the air to be sucked downwardly through the material. Depending on the air circuit configuration, the support pillars are integrated into same as air feed or as air discharge members.

The roof itself is of a comparatively simple construction, comprising a stiffening tubular frame structure of a generally boiler end plate-like contour, which carries a roof skin which is stretched thereover, preferably comprising canvas or tent material, and also carries the wall means or skirt.

All in all the arrangement provides a major simplification in the crushing and composting operation for coarse refuse, in particular for garden or field refuse which is collected at central points.

BRIEF DESCRIPTION OF THE DRAWINGS

Further advantages, features and details of the invention will be apparent from the following description of preferred embodiments and with reference to the drawings in which:

FIG. 5 is a perspective view of the part shown in FIG. 4;

FIG. 6 is a diagrammatic view in longitudinal section through a composting apparatus;

DETAILED DESCRIPTION

Figures 1, 2:
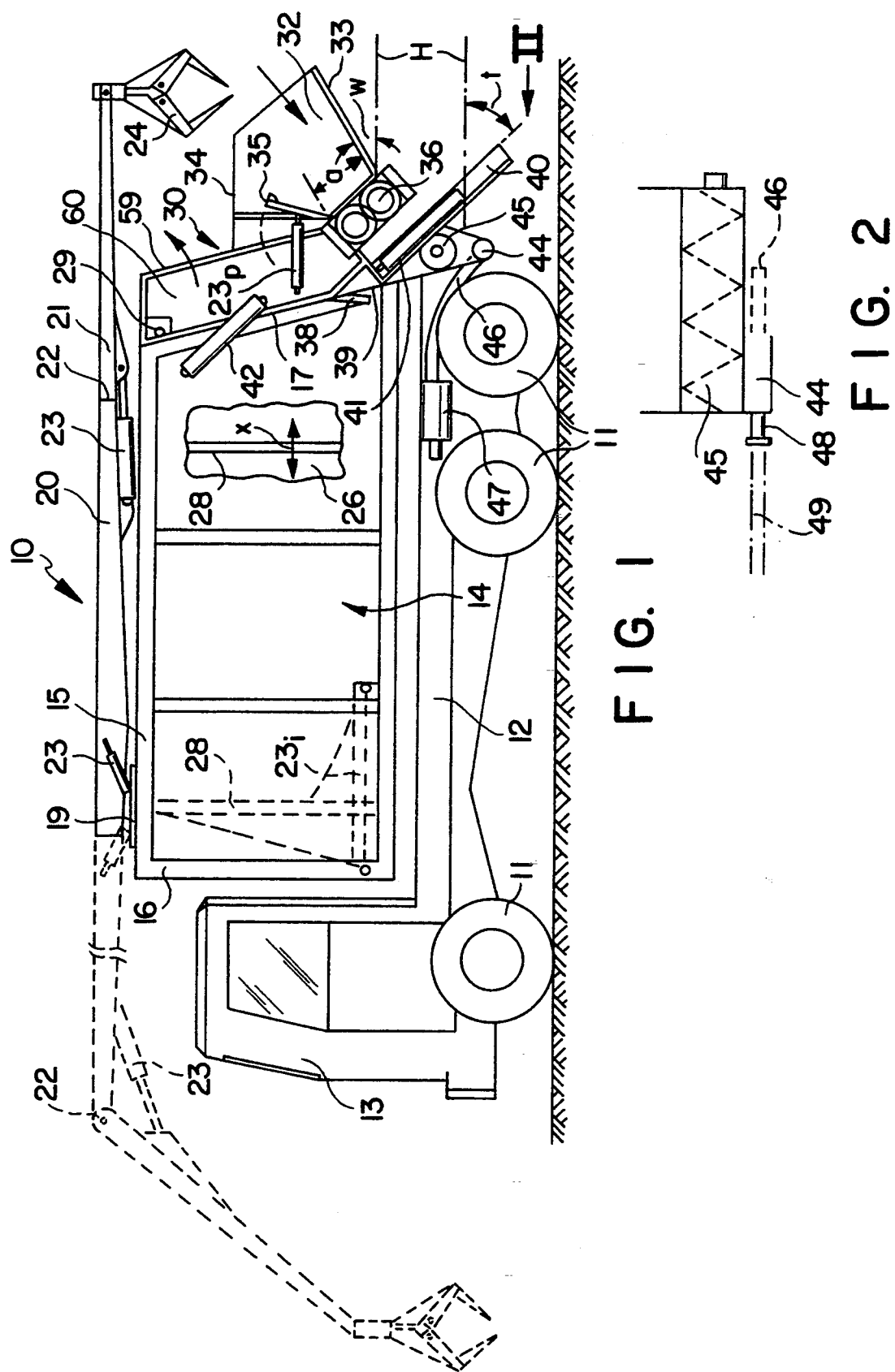
FIG. 1 is a side view of a vehicle shown partly in section.
FIG. 2 shows an enlarged detail from FIG. 1, viewing in the direction of the arrow II therein.

A collection vehicle 10 comprises, on a vehicle bed or platform 12 which extends over pneumatic tires 11, a square box-like container structure 14, the roof 15 of which, adjacent the front wall 16 adjoining a driving cab 13, carries a slewing ring 19 for a grab arm 20. A lower arm 21 is pivotally connected to the latter and is controllable by means of a hydraulic cylinder 23 associated with the pivot or hinge 22. A grab device 24 is suspended at the free end of the lower arm 21. The grab arrangement 20 through 24 is pivotable about the entire vehicle 10.

A thrust wall member 28 is disposed in the interior 26 of the container, movable in the direction indicated by the arrow X, by means of a hydraulic cylinder 23, between the front wall 16 and an inclined collecting or tail wall member 17.

A tail structure or attachment 30 on the vehicle 10 is provided with an outwardly projecting filling hopper 32 for coarse refuse such as bushes or shrubs or the like. The bottom 33 of the hopper 32, which is inclined at an angle w of for example 40° relative to the horizontal H is faced at a spacing a by a pressing plate 35 which can be pivoted by means of a hydraulic cylinder $23_p$ and which is pivotally mounted above a cutting or screw mill 36 with low-speed rollers. The mill 36 is disposed upstream of a retaining device 38, a flap, a comb or swinging tooth members, which covers a base slot 39 in the wall member 17.

A thrust plate 40 with a hydraulic cylinder 41 extends beneath the screw or cutting mill 36 in parallel relationship therewith and at an angle t of about 45° relative to the horizontal H. Hydraulic devices 42 which are arranged further up also permit the tail structure to be pivoted away from the vehicle about an axis 29 in the region of the roof.

A conveyor screw 45 extends beneath the thrust plate 40 which is provided with a thrust edge 43, and above a hopper 44. The air conduit 46 of a fan or blower 47 communicates with the hopper 44; shown at the other end is a quick-action connection 48 for an outside conduit which is indicated at 49.

Figure 3:
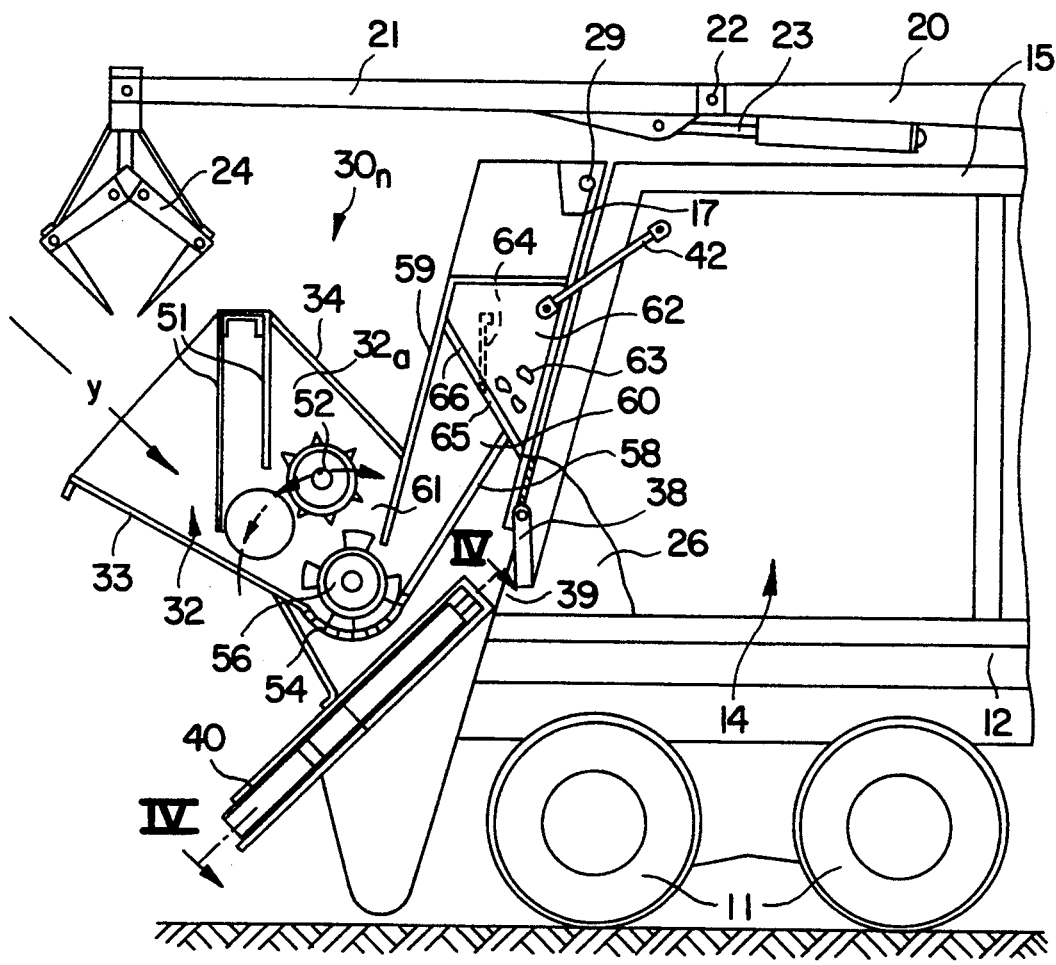
FIG. 3 shows an enlarged detail from FIG. 1 concerning another embodiment.
Figure 4:
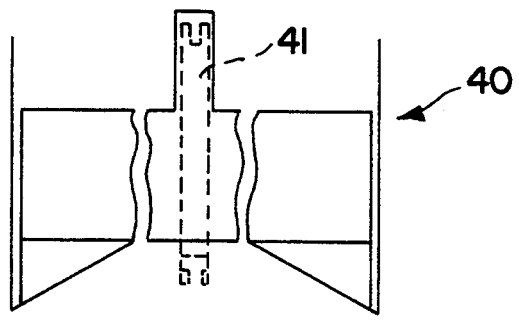
FIG. 4 is a plan view of a part of FIG. 3.

In the preferred embodiment of the tail structure $30_n$ as shown in FIG. 3, rubber aprons 51 hang from the cover or top 34 of the filling hopper 32 into the space $32_a$ in the hopper, for safety reasons. A spiked draw-in roller 52 which is adapted to be pivoted in parallel-axis arrangement is provided downstream of the rubber aprons 51 in the direction of introduction of the material as indicated at y, and arranged beneath the roller 52 and above a curved grid 54 is an impact rotor 56 as is described by way of example in the specification on German utility model No 87 04 007. The curved grid 54 is disposed between the bottom 33 of the filling hopper 32 and an inclined intermediate wall portion 58 which, with an outside wall portion 59 of the tail structure 30, delimits an impact space 60. The wall portion 59 terminates at the impact rotor 56 with an impact comb 61.

Adjoining the impact space 60 in an upward direction is a collecting box 62 for stones 63 or the like hard items which pass upwardly through an opening 65 in a transverse plate 66 and which can be removed as desired. The opening 65 in the transverse plate 66 can be closed by means of a flap 64. When the stones 63 or the like are slung upwardly, the flap 64 is opened in an upward direction and then automatically drops back on to the opening 65.

The members 44 to 49 which have been described with reference to FIG. 1 are also to be found in the FIG. 3 structure but are omitted from the drawing for the sake of improved clarity.

Instead of the thrust plate 40 which is shown on an enlarged scale in FIG. 5, it is also possible to envisage the provision of a plurality of conveyor screws as feed members for feeding the particulate material which drops down through the grid 54 to the interior 26 of the container; the coarse refuse such as shrubs, bushes or the like is fed to the impact rotor 56 by way of the draw-in roller 52 which is movable in axis-parallel relationship, crushed by means of the rotor 56 over the curved grid 54, and drops through the latter on to the thrust plate 40. From there or, as stated, from a corresponding conveyor, the crushed pieces pass into the container interior 26; hard items are slung upwardly through the space 60 into the collecting box 62.

When the vehicle 10 has arrived at the point of unloading thereof, as shown in FIG. 6, the tail structure 30, $30_n$ is pivoted upwardly about its axis 29 and the discharge devices 44 through 48 are set in operation; the outside conduit 49 is connected and the thrust wall member 28 begins to push the contents of the container towards the base slot 39 in the tail wall member 17.

The crushed refuse which is free of hard items passes through a trough-like intermediate station 68 with integrated conveyor screw or by way of a pneumatic conveyor installation 69 to a small-scale rotting installation 70.

Figure 7:
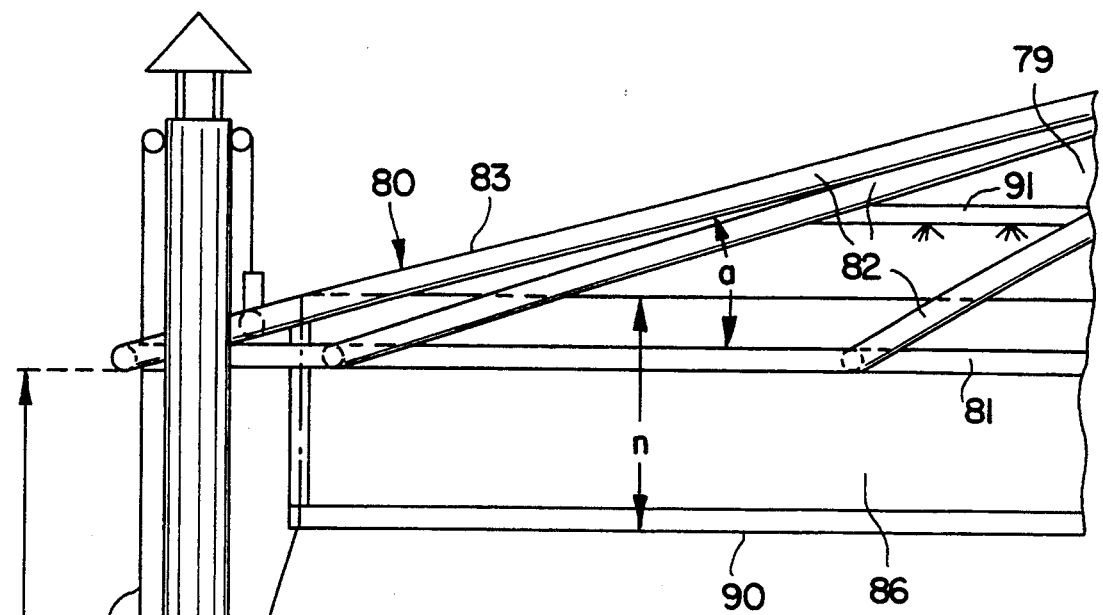
FIG. 7 is a plan view of a part of FIG. 6.

As shown in FIG. 7, the installation 70 has an approximately circular polygonal floor plate 72, of a diameter d of 11 meters and with an edge length e of the polygon of rather more than 280 cm, with a subaequoral passage system; an underground air passage is shown in FIG. 7 at 73, other passages are only indicated. They extend radially from a center 74 of the structure and are provided with upwardly facing slots or holes (not visible in the drawing) for the feed or discharge of air.

Figure 8:
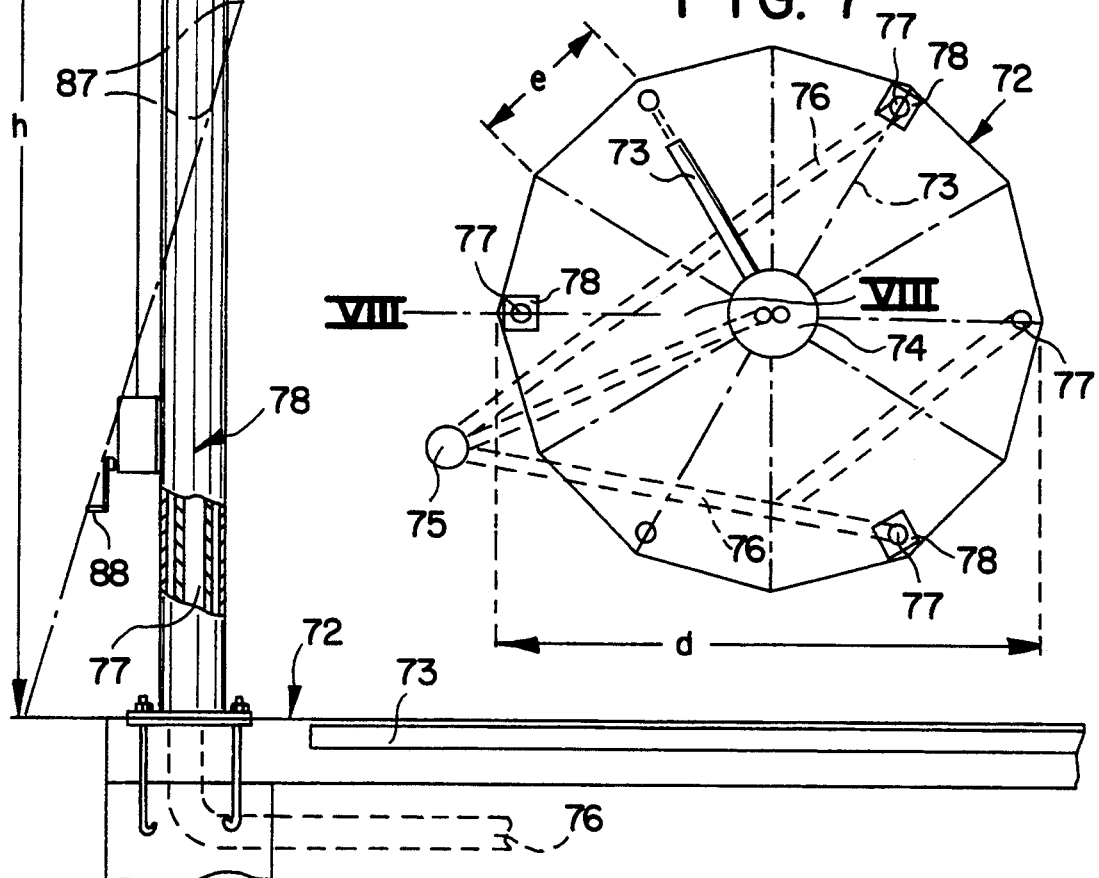
FIG. 8 is a view on an enlarged scale and in vertical section through a part of FIG. 6.

Also shown in FIGS. 7 and 8 are air pipes 76 which on the one hand extend from the center 74 to a connecting point 75, with a suction or compression device, and from there to vertical pipes 77 of which three are contained in support pillars 78 for a roof 80.

The roof 80 comprises a tubular ring 81 and spoke-like tubes 82 which extend therefrom at an angle q, consisting of Siderohr 82.5/3.2, forming a pointed roof structure for a roof membrane 83, preferably for a canvas or tent material skin. At the apex $74_z$ of the roof, a vertical feed shaft 85 is connected to a pneumatic conveyor installation 69 or the like, while an annular apron or skirt 86 of a height n of about 800 mm is fixed beneath the roof membrane 83 to the roof structure 81/82. The skirt or apron 86 can be adjusted.

The roof 80 is guided movably vertically on its support pillars 78 up to a height h of about 5 meters (upper position as shown at 80' in FIG. 6), and is additionally secured by adjustable lateral lanyards 87. In the illustrated embodiment, displacement of the roof 80 is effected by means of the crank 88 of a cable arrangement 89.

In order to set up a silo M, the lower edge 90 of the roof is set on to the floor 72, then fine refuse is centrally supplied through the shaft 85 by way of the conduit 69 and slung radially outwardly by means of a centrifuging member 84. In that operation the annular skirt or apron 86 forms an impact wall, acting as a boundary means. When a bottom composting layer $M_1$ of a height z of for example 200 to 400 mm has been produced, the roof 80 is raised approximately by that dimension z and a further layer is formed.

In that way it is possible to control rotting and composting in a layer-wise manner, while fresh water or fertilizers which have been pumped up can trickle down out of spray pipes 91 in the roof region, and wet the silo M.

Ventilation of the silo $M_1$ or M is effected by the above-described air passages 73 and the upwardly directed slots thereof; the air moves from below through the silo M and is collected in the head space above the material, that is to say, in the interior 79 of the roof, in order to be carried downwardly again into the air passages 73 in the floor. It is also possible for air which is present there, from the interior 79 of the roof, to be transferred into an adjoining silo arrangement.

It will be appreciated that it is within the scope of the invention for the air circuit to be of a different configuration, that is to say for the air to be sucked through the silo arrangement towards the floor from the interior 79 of the roof, and for it to be discharged through the air passages 73.

In both cases the vertical pipe or tube 77 in the support pillar 78 is part of the venting and ventilation system. It may be connected to the interior 79 of the roof by means of sliding connector members in a manner not shown in the drawing.

I claim:

1. A vehicle for transporting garbage or refuse, in particular coarse refuse such as shrubs or bushes or the like, comprising a container for accommodating the garbage, a tail structure for feeding the garbage into the container, said tail structure including an intake hopper mounted to an outside wall portion of the tail structure, a slow-speed cutting mill (36) disposed downstream of said intake hopper (32), said cutting mill arranged above a conveyor element (40) and below an impact space (60) defined in part by said outside wall portion, said impact space being located above the cutting mill for receiving hard items, said cutting mill cutting refuse inserted into said hopper and dropping said cut refuse onto said conveyor element, the conveyor element being arranged substantially parallel to said cutting mill and terminating at an opening (38) through a rear wall of the container and being used to convey cut material to said container.

2. A vehicle as set forth in claim 1 characterised in that the intake hopper (32) extends above a bed (12) of said vehicle.

3. A vehicle as set forth in claim 1 characterised in that at least one pivotable draw-in roller (52) is arranged upstream in the filling direction (y) of the cutting mill (36).

4. A vehicle as set forth in claim 1 characterised in that at least one of a thrust plate and at least one conveyor screw serve as the conveyor element (40).

5. A vehicle as set forth in claim 1 characterised in that said tail structure (30) is mounted to said container so that said tail structure can be moved away from the opening (39) through the rear wall (17) of the vehicle (10) and a conveyor means for discharged refuse being provided below the tail structure on the vehicle.

6. A vehicle as set forth in claim 5 characterised by a collecting screw (45) which extends transversely with respect to a longitudinal axis of the vehicle and which is connected to a conveyor conduit (48).

7. A vehicle as set forth in claim 6 characterised in that the conveyor conduit (48) is adapted to be connected to an intermediate station (68) of a compost silo (M).

8. A vehicle as set forth in claim 1 characterised in that a slewing ring (19), with a grab arm (20), is fixed on a roof (15) of the vehicle, and a grab device (24) of the grab arm is pivotable about the vehicle (10).

9. A vehicle as set forth in claim 8 characterised in that the grab arm (20) has two parts and is provided with a pivot (22) and a hydraulic cylinder (23) which connects the two parts of the arm.

10. A vehicle for transporting garbage or refuse, in particular coarse refuse such as shrubs or bushes or the like, comprising a container for accommodating the garbage and a tail structure for feeding the garbage into the container, said tail structure including an intake hopper mounted to an outside wall of said tail structure, an impact rotor having an impact circle disposed downstream of said intake hopper (32) for crushing said refuse, a correspondingly curved grid (54) adjoining the impact circle of the rotor (56) and extending above a conveyor element (40) positioned between the intake hopper and a wall (58) of an impact space (60) so that particles crushed by said impact rotor pass through said grid and drop onto said conveyor element, the conveyor element terminating at an opening (38) through a rear wall (17) of the container and being used to convey said crushed particles to said container, and said impact space receiving hard items slung up by the action of said impact rotor.

11. A vehicle as set forth in claim 10 characterised in that a collecting box (62) for hard items is arranged above the impact space (60), said collecting box being connected to the impact space by an opening (65) which is closed by means of a flap.

12. A vehicle as set forth in claim 10 characterized in that at least one pivotable draw-in roller (52) is arranged upstream in the filling direction (y) of the impact rotor (56).

* * * * *